United States Patent
Bell et al.

(10) Patent No.: US 10,227,067 B2
(45) Date of Patent: Mar. 12, 2019

(54) HEV BATTERY MANAGEMENT FOR GENERATING OFF-BOARD POWER

(71) Applicant: FORD GLOBAL TECHNOLOGIES, LLC, Dearborn, MI (US)

(72) Inventors: Christopher W. Bell, Livonia, MI (US); Tianbo Xu, Canton, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/474,807

(22) Filed: Mar. 30, 2017

(65) Prior Publication Data

US 2018/0281773 A1    Oct. 4, 2018

(51) Int. Cl.
| | |
|---|---|
| *B60W 20/13* | (2016.01) |
| *B60W 10/06* | (2006.01) |
| *B60W 10/08* | (2006.01) |
| *B60L 11/18* | (2006.01) |

(52) U.S. Cl.
CPC .......... *B60W 20/13* (2016.01); *B60L 11/1814* (2013.01); *B60W 10/06* (2013.01); *B60W 10/08* (2013.01); *B60L 11/1861* (2013.01); *B60W 2510/244* (2013.01); *Y10S 903/93* (2013.01)

(58) Field of Classification Search
CPC ............................ B60W 20/13; B60L 11/1814
See application file for complete search history.

(56) References Cited

U.S. PATENT DOCUMENTS

| | | | | |
|---|---|---|---|---|
| 7,960,857 | B2* | 6/2011 | King ................... | B60L 11/1816 307/10.1 |
| 8,508,069 | B2* | 8/2013 | Schaffnit ............... | B60L 3/0046 307/10.1 |
| 8,666,572 | B2* | 3/2014 | Mitsutani ................ | B60K 1/02 701/22 |
| 8,975,767 | B2* | 3/2015 | Algrain ..................... | H02J 3/32 290/7 |
| 8,996,227 | B2* | 3/2015 | Sisk ........................ | B60L 11/12 701/22 |
| 9,276,453 | B2* | 3/2016 | Galvan .................. | H02K 53/00 |
| 9,315,190 | B2* | 4/2016 | Yu .......................... | B60W 10/06 |
| 9,505,311 | B2* | 11/2016 | Frank .................. | B60L 11/1814 |

(Continued)

*Primary Examiner* — Alex C Dunn
(74) *Attorney, Agent, or Firm* — David B. Kelley; Brooks Kushman P.C.

(57) ABSTRACT

A hybrid electric vehicle includes an internal-combustion engine (ICE) and an electric machine coupled to a battery, an off-board power (OBP) system, and a controller, which are configured to power internal vehicle and battery charge electrical loads, and external electrical loads. The controller monitors the electrical loads, and responds to an OBP signal identifying an external electrical load, and commands the ICE and electric machine to generate a combined-power greater than or equal to the loads. This ensures that a battery state-of-charge is sustained and not depleted by power delivery to the external loads. The controller also generates a power-difference signal that identifies a difference between power generated by the electric machine and power consumed by the internal and external OFB electrical loads, such that the controller can adjusted the generated combined-power to minimize the power-difference signal and battery charge-discharge-cycles.

12 Claims, 2 Drawing Sheets

(56) References Cited

U.S. PATENT DOCUMENTS

| | | | | |
|---|---|---|---|---|
| 9,797,361 | B2* | 10/2017 | Shibachi | F02N 11/0866 |
| 2007/0170781 | A1* | 7/2007 | Jabaji | B60L 1/00 |
| | | | | 307/10.1 |
| 2008/0096717 | A1* | 4/2008 | Houle | B60K 6/387 |
| | | | | 477/5 |
| 2009/0294191 | A1* | 12/2009 | Sheidler | B60K 6/48 |
| | | | | 180/65.31 |
| 2013/0127475 | A1* | 5/2013 | Sitarski | B60L 11/1868 |
| | | | | 324/435 |
| 2014/0266051 | A1* | 9/2014 | Hayakawa | H02J 7/0016 |
| | | | | 320/118 |
| 2014/0303821 | A1* | 10/2014 | Oda | B60L 1/006 |
| | | | | 701/22 |
| 2015/0112522 | A1* | 4/2015 | Liang | B60W 10/06 |
| | | | | 701/22 |
| 2016/0236586 | A1* | 8/2016 | Soo | B60L 11/1862 |
| 2017/0298890 | A1* | 10/2017 | King | F02N 11/0862 |

\* cited by examiner

HEV BATTERY MANAGEMENT FOR GENERATING OFF-BOARD POWER

TECHNICAL FIELD

The disclosure is related to hybrid electric vehicles having electric machines configured to supply off-board power.

BACKGROUND

Hybrid Electric Vehicles (HEVs) having an internal combustion engine (ICE) and electric machines or traction motor/generators (M/Gs) coupled with batteries, are typically configured to sustain optimal battery life by controlled cycles of charging and depleting the batteries. For certain applications, HEVs are also configured to supply energy external to the vehicle, and to off-board electrical equipment. Delivering off-board electrical power from the HEV can result in repetitive, undesirable cycling of battery charging and depleting.

SUMMARY

The present disclosure enables new capabilities for improved control and management of battery charge and discharge/depletion cycling when the HEV is configured to supply off-board electrical power. The innovation enables optimal and limited battery charge-discharge cycling during delivery of such off-board power. This improved system and method of operation establishes a closed-loop control capability of both the off-board power delivery and the powertrain battery charging-discharging subsystems. The HEV is configured to generate an error signal identifying the difference between the off-board power delivery and the combination of the M/G output and other vehicle power loads. This error signal is continuously monitored and the HEV components are adjusted to minimize the error signal difference. Minimization of the power difference prevents repetitive and undesirable cycling of battery depletion and charging during off-board power delivery.

The improved HEV includes an ICE and an electric machine or motor/generator (M/G) that are coupled to a battery, an off-board power (OBP) system, and one or more controllers, which are configured to power internal and external electrical loads. The controller(s) monitor the internal and external electrical loads, and a state-of-charge (SoC) of the battery that may decrease and require battery charging. The controller(s) respond to an OBP signal identifying an external electrical load, and commands the ICE and M/G to generate a power greater than or equal to the internal, external, and battery charging loads. The controller(s) are configured to sustain and prevent depletion of the SoC while delivering electrical power to the external loads, such that undesirable degradation of battery life is prevented, which may result from repeated battery charge-discharge cycles otherwise arising from off-board power delivery.

The controller(s) also generate a power-difference signal that identifies a difference between power generated by the M/G and power consumed by internal and external electrical loads, and battery charging electrical loads. The controller(s) can minimize the power-difference signal by adjusting the generated power of the M/G, such that battery charge-discharge-cycles are also minimized. During delivery of off-board power, other components and systems of HEV may consume power beyond that currently being generated by M/G, which may be delivered from the battery. The controller(s) also monitor the battery SoC and command the M/G to generate additional power beyond that being delivered to off-board electrical loads, to recharge the battery when the SoC decreases below a charge-threshold.

Additionally, in further variations of the disclosure, the controller(s) monitor the OBP system to detect increases and decreases in the external electrical loads. In response to detected increases in electrical demand from off-board electrical loads, the controllers(s) may command M/G to generate additional power, and if the demand exceeds the capacity of the M/G, then the additional demand may be delivered from the battery. In further modifications, when the increased demand exceeds the capacity of both the M/G and the battery, then the controller(s) may generate an excess-demand signal that commands adjustment of power being delivered to the OBP system, the battery, or both, and may also terminate delivery of power to the OBP system to prioritize recharging of the battery.

The controller(s) may also monitor the combined external and internal vehicle electrical loads. In response to the combined loads exceeding a maximum electrical generating capacity of the M/G, the controller(s) may reduce power delivered to the external loads while delivering power required by one or more of the internal vehicle electrical loads, which may include, for example, the ICE, a cabin cooling system, vehicle lights, a hydraulic pressure pump, and another vehicle component. Other modifications that are contemplated by the disclosure include the controller configured to detect changes in internal electrical loads and external off-board electrical loads (OBLs), and to adjust the ICE to respectively and correspondingly increase and decrease power generated by the M/G.

The controller(s) receive in response a priority signal that commands at least one or one or more possible reconfigurations of (a) supplying power from the battery to meet the increased electrical loads, (b) reducing power supplied to internal vehicle electrical loads to meet the increased electrical loads, and (c) limiting power delivered to the external electrical loads to prevent battery discharge. In other variations that include battery discharge, a low-battery signal may be generated when a state-of-charge (SoC) of the battery decreases to a predetermined SoC-minimum or charge-threshold, to adjust, reduce, and/or terminate delivery of power to one or more of the external and/or internal electrical loads, to enable recharge of the battery.

The HEV also includes arrangements having the ICE coupled to the M/G, the battery, and at least one controller, which are configured to power the internal and external electrical loads, and having the controller configured to monitor internal vehicle electrical loads, battery charge, and external electrical loads, and to command the ICE and M/G to generate a power that equals or exceeds the loads, and which delivers power to the external loads, such that a battery state-of-charge remains unchanged. As with other variations, the at least one controller is again configured to generate the power-difference signal identifying the difference between power generated by the M/G and power consumed by the internal and external electrical loads, and to adjust the power generated by the M/G to minimize the power-difference signal and battery charge-discharge-cycles.

The controllers are also configured to monitor the battery SoC, and to adjust the M/G to generate additional power to charge the battery in response to the SoC decreasing below the charge-threshold. This adaptation also may incorporate the OBP system coupled to the controller and other components, and the controllers further adapted to monitor the OBP system to detect increases and decreases in the external load. In response to an increase in demand to the OBP system by the OBLs that exceeds a maximum combined-power capacity of the M/G and the battery, the controllers generate an excess-demand signal that commands discontinued delivery of power to the OBP system. For external OBL decreased and increased demands that do not exceed the maximum, the controllers are configured to adjust the ICE to respectively and correspondingly decrease and increase power generated by the M/G, and to deliver power to the external electrical loads. As already described, the controllers in this variation may also receive the priority signal and the low battery signal, which command and/or enable further modified configurations.

The disclosure is additionally directed to methods of operation of the HEV that include providing the ICE and M/G coupled with the battery and OBP system that are configured to power internal and external electrical loads. The method also enables generating, by the one or more controllers, and in response to the OBP signal, a power that equals or exceeds the loads, as well as delivering power to the external loads, such that the battery SoC is sustained. The method also may include generating by the controller a power-difference signal identifying the difference between power generated by the M/G and consumed by the internal and external electrical loads, and adjusting the generated-power to minimize the power-difference signal and battery charge-discharge-cycles. In modified arrangements, the method may contemplate monitoring by the controller the SoC of the battery, and adjusting the M/G to generate additional power to charge the battery in response to the SoC decreasing below the charge-threshold.

The methods of operation further incorporate monitoring by the controller the OBP system to detect increases and decreases in the external electrical loads, and in response to an increase in demand for the OBP system that exceeds a maximum combined-power capacity of the M/G and the battery, generating an excess-demand signal that commands discontinued delivery of power to the OBP system. In response to the generated excess-demand signal, the controllers are also adapted for receiving in response the priority signal that commands one or more reconfigurations as noted, of: (a) supplying power from the battery to meet the increased electrical loads, (b) reducing power supplied to internal vehicle electrical loads to meet the increased electrical loads, and (c) limiting power delivered to the external electrical loads to prevent battery discharge.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
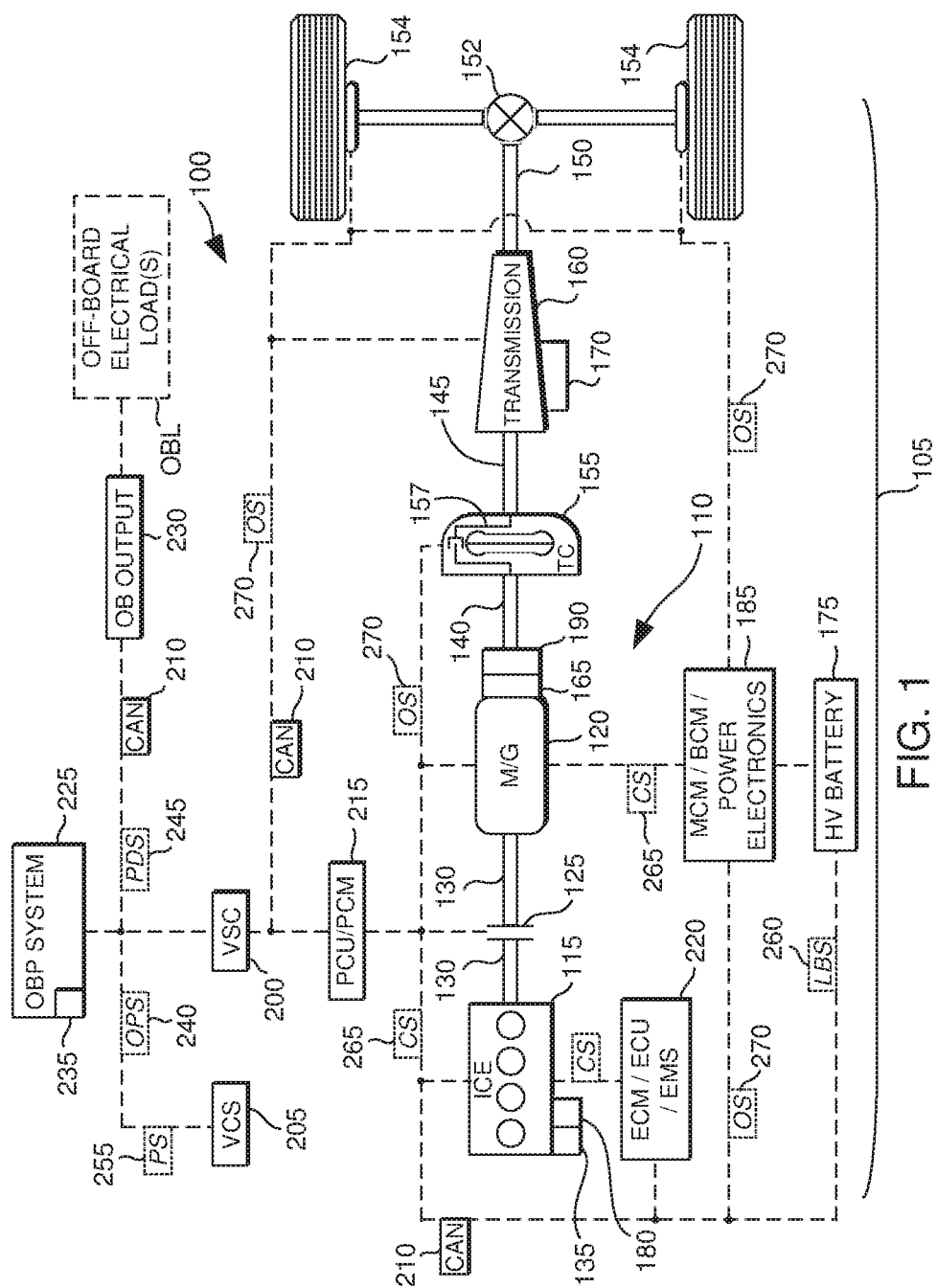
FIG. 1 is an illustration of according to the disclosure of a hybrid electric vehicle and its systems, components, sensors, actuators, and operational functions.
Figure 2:
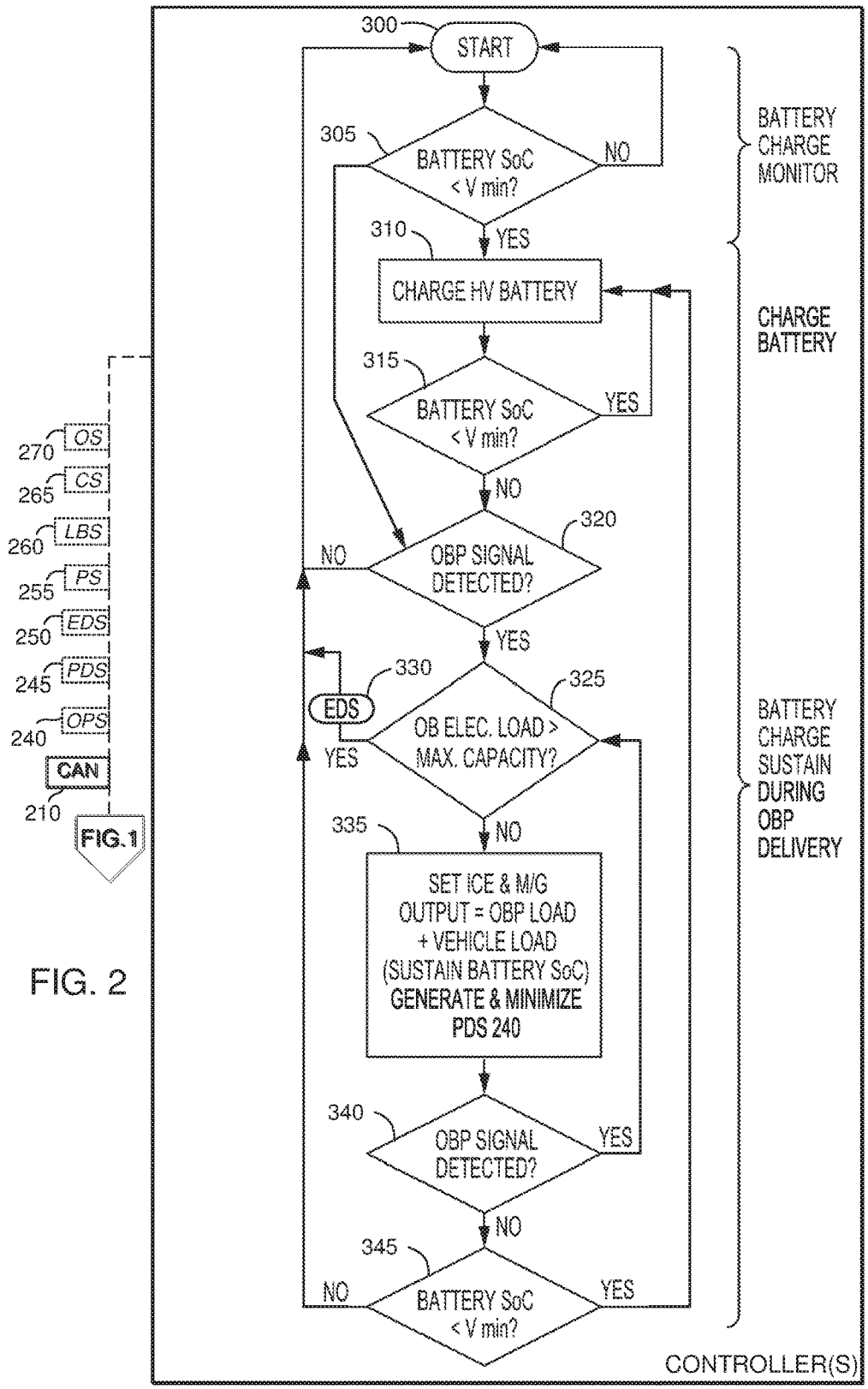
FIG. 2 illustrates certain aspects of the disclosure depicted in FIG. 1, and describes examples and method steps that depict other operational capabilities of the disclosure.

With reference now to the various figures and illustrations that include FIGS. 1 and 2, and specifically to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which generate power and torque to propel vehicle 100. Engine 115 is a gasoline, diesel, biofuel, natural gas, or alternative fuel powered engine, or a fuel cell, which generates an output torque in addition to other forms of electrical, cooling, heating, vacuum, pressure, and hydraulic power by way of front end engine accessories described elsewhere herein. Engine 115 is coupled to electric machine or M/G 120 with a disconnect clutch 125. Engine 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable negative torque operation as an electric generator, and to other components of vehicle 100. Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G or electric machine 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140 for forward and reverse propulsion. When in generator mode, M/G 120 may also be commanded to produce negative torque (not transmitted to shaft 140 for propulsion) and to thereby generate electricity for charging batteries and powering vehicle electrical systems, while engine 115 is generating propulsion power for vehicle 100. M/G 120 also may enable regenerative braking by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Driveline 105 may be further modified to enable regenerative braking from one or any wheel 154 using a selectable and/or controllable differential torque capability.

Drive shaft 130 of engine 115 and M/G 120 may be a continuous, single, through shaft that is part of, and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a torque convertor (TC) 155, which couples engine 115 and M/G 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100.

In other variations, a transmission oil pump 165 is included and is coupled to M/G 120 to produce hydraulic oil pressure for any number of components, which can include, for example, release or disconnect clutch 125, torque converter 155, bypass clutch 157, and transmission 160, when engine 115 is decoupled and/or powered down. An electric auxiliary transmission oil pump 170 may also be included for use alone or in combination with other components, and to also supplement and/or generate hydraulic pressure when both engine 115 and M/G 120 are unpowered, or otherwise unable to produce hydraulic pressure.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage (HV) M/G battery 175 is also coupled to M/G 120 by one or more of a motor control module (MCM), a battery control module (BCM), and/or power electronics 185, which are configured to condition direct current (DC) power provided by high voltage (HV) battery 175 for M/G 120. MCM/BCM/power electronics 185 are also configured to condition, invert, and transform DC battery power into three phase alternating current (AC) as is typically required to power electric machine or M/G 120. MCM/BCM 185/power electronics is also configured to charge one or more batteries 175, 180 with energy generated by M/G 120 and/or front end accessory drive components, and to supply power to other vehicle components as needed.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, VSC 200 and VCS 205 may control, be controlled by, communicate signals to and from, and exchange data with other controllers, and other sensors, actuators, signals, and components that are part of the larger vehicle and control systems and internal and external networks. The capabilities and configurations described in connection with any specific microprocessor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and TC 155, to control each powertrain component. An engine control module (ECM) or unit (ECU) or energy management system (EMS) 220 may also be included having respectively integrated controllers and be in communication with CAN 210, and is coupled to engine 115 and VSC 200 in cooperation with PCU 215 and other controllers. In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM/BCM/power electronics 185, brakes 190, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For further example, various other vehicle functions, actuators, and components may be controlled by the controllers within the vehicle systems and components, and may receive signals from other controllers, sensors, and actuators, which may include, for purposes of illustration but not limitation, front-end accessory drive (FEAD) components such as transmission oil pump 165, a FEAD alternator or generator, M/G 120, high and low voltage batteries 175, 180, and various sensors for battery charging or discharging (including sensors for determining the maximum charge, state of charge—SoC, and discharge power limits), temperatures, voltages, currents, and battery discharge power, and other components. Sensors communicating with the controllers and CAN 210 may, for further example, establish or indicate engine rotational speed or revolutions per minute (RPM), wheel speeds, vehicle speed sensing (VSS), ignition switch position (IGN), among others.

With continuing reference to FIGS. 1 and 2, the disclosure contemplates HEV 100 including ICE 115 coupled with electric machine or M/G 120 and high-voltage (HV) storage battery 175, and various controllers. Such other controller(s) may include, for example, MCM/BCM/power electronics 185, PCU/PCM 215, VSC 200, and VCS 205, which are configured to power internal and external electrical loads. HEV 100 includes internal electrical loads for ICE 115, lighting, climate control systems, and a number of other electrically actuated and operated devices and components. An off-board power system (OBP) 225 is coupled to the controllers, including for example the power electronics 185, and includes an off-board output (OB) 230 that may be a distribution panel of one or more receptacles for a variety of possible off-board electrical loads (OBL). Such OBLs may include any number of electrical loads external to HEV 100, which may be suitable for being powered by M/G 120 and battery(ies) 175, 180, such as, for example without limitation, household devices and appliances, power tools, personal electronics, audiovisual and lighting equipment, for any number of possible power, voltage, current, and direct or alternating current configurations, including other types of power conversion devices that may further convert supply power. These controller(s) are configured to monitor the internal electrical loads and OBLs, and a state-of-charge (SoC) of the batteries 175, 180, to detect when the SoC may decrease enough to require charging.

The controller(s), including the OBP system 225, monitor and detect external electrical loads when such are connected to OB 230. OBP system 225 may also be configured to energize OB 230 by interactively enabling a user to energize OB 230 via a display or other user interface such as VCS 205 or another interface or manual switch. Further, OBP system 225 incorporates a power monitor 235 configured to detect and communicate status of each external electrical load, which status may be communicated to a display or other component, which may also be included as part of VCS 205, or another of the described controllers. Upon detecting an external load or being interactively energized, the OBP system 225 and/or other controllers, such as an embedded controller or controllers integrated with the OB output 230, generate an OBP signal (OPS) 240. The detected OPS 240 may include information identifying and regarding the detected external load, such as a receptacle identifier for OB output 230, and voltage, current, frequency, impedance, connection time, power transfer efficiency, power consumed over time, data that may be communicated to and from the external electrical load, and related information.

OBP system 225 and/or other controllers are also configured to respond to the detected OPS 240 for the identified external electrical load, and to command and adjust ICE 115 and M/G 120 to generate a power to be delivered to the load through OB 230. The controllers continue to monitor the identified load and power consumption, and to adjust ICE 115 and M/G 120 to generate and deliver power that meets or exceeds, and is greater than or equal to the detected external load. OBP 225 also communicates with and monitors other controllers such as MCM/BCM/power electronics 185 and PCU 215, and others, to monitor internal component and battery-charging electrical loads, and to further command and adjust ICE 115 and M/G 120 to generate enough power to meet or exceed the combined internal vehicle loads and external OBLs.

Further, OBP 225 may also be configured to communicate directly with and monitor various devices and components of HEV 100, including for example HV battery 175 to monitor its SoC. In this way, the controller(s) are configured to sustain and prevent depletion of the SoC while delivering electrical power to the external loads, and to command and adjust ICE 115 and M/G 120 to generate additional power to prevent depletion of HV battery 175, such that SoC remains unchanged during delivery of power to OBLs and other vehicle components. The controllers are also capable of utilizing power from battery 175 in certain configurations that require additional power to be delivered to OBLs.

During delivery of off-board power to OBLs, other components and systems of HEV 100 may be configured to demand and/or consume power in excess of what may currently be generated by M/G 120. In certain situations, the excess demand may be delivered from battery 175. For example, it may be desired to deliver more power than can be generated by M/G 120. In this circumstance, the controller(s) when so configured, may automatically and/or interactively in response to the OPS 240 and a user interaction, command and adjust ICE 115 and M/G 120 to generate a maximum power, and BCM/power electronics 185 to also discharge HV battery 175 and deliver the additionally demanded power for a period of time to the OB output 230 and OBLs. During such combined-power generation and delivery of M/G 120 and battery 175, the controller(s) monitor the SoC of HV battery 175. When the SoC of HV battery 175 decreases below a charge-threshold, the controllers may adjust, reduce, and/or terminate the power being delivered to OBLs and internal electrical loads, and command the M/G to generate maximum power, and deliver it to power electronics 185 to recharge the battery.

The disclosure is also directed to configurations of HEV 100 having the controller(s) adapted to generate a closed-loop, power-difference signal (PDS) 245, which is embedded with information identifying a difference between the power generated by the M/G 120 and the power consumed by internal and external electrical loads, including the electrical load consumed for charging the HV battery 175, if any. The controller(s) are configured to minimize PDS 245 by adjusting the power output being generated by M/G 120. By minimizing PDS 245, the controllers also minimize the charge-discharge-cycles of HV battery 175 while power is being delivered to OBLs, and internal electrical loads.

The disclosure also includes adaptations of the controller(s) to monitor OBP system 225 to detect increases and decreases in the external, OBLs, and in response to detected increases and decreases in OBLs, the controllers command and correspondingly adjust M/G 120 to increase and decrease power generation. As before, the controllers monitor and detect whether the demand of OBLs and/or internal electrical loads, including increased demands, exceed the power generation capacity of M/G 120. When such demands exceed the capacity of M/G 120, and the combined-capacity of M/G 120 and HV battery 175, then the controller(s) are configured to generate an excess-demand signal (EDS) 250. Initially, the controllers may communicate and annunciate EDS 250 to a display and/or VSC 200, VCS 205, or other controllers, and receive a reply.

The EDS 250 may include information such as commands to adjust ICE 115 and M/G 120, to modify the power delivered to OBP system 225, to internal electrical loads, to HV battery 175, or all of these and other components, which ensures that the demands do not exceed the capacity. Such adjustments may also include, as described elsewhere herein, terminating power delivery to the OBP system 225 and OBLs, and other components of HEV 100, to prioritize recharging of HV battery 175. For example, in response to EDS 250, the controller(s) may automatically respond with a control signal that commands a predetermined configuration change in OBP system 225, and may receive a priority signal (PS) 255.

The PS 255 may include information and commands that reconfigure HEV 100 and various controllers, components, and systems, such that at least one or one or more reconfigurations of (a) power is supplied from the battery to meet the increased electrical loads, (b) power supplied to internal vehicle electrical loads is reduced to meet the other increased electrical loads, (c) power delivered to the external OBLs is reduced to prevent battery discharge, and (d) power delivered to OBLs and other vehicle electrical loads is terminated or discontinued, among other possible actions. PS 255 may include predetermined reconfigurations for each of various possible conditions annunciated by EDS 250. PS 255 may also further include interactively established reconfigurations that are adjusted/adjustable by a user, manufacturer, dealer, or other technician during manufacture and service of HEV 100 and/or in real-time when the OBP system 225 is utilized by the user, which can be accomplished with VCS 205 and associated displays, and/or other controllers of HEV 100.

During delivery of power that includes discharge of HV battery 175, the controllers and signals also are configured to generate a low-battery signal (LBS) 260, when a state-of-charge (SoC) of the battery decreases to a predetermined charge-threshold or SoC-minimum, which may in turn generate any of the preceding signals, and wherein LBS 260 may include commands and information to cause reduced, adjusted, and/or terminated delivery of power to one or more or all of the external OBLs and/or internal electrical loads, which enables recharging of HV battery 175 by M/G 120.

Similarly, controller(s) also may monitor the combined external OBLs and the internal vehicle electrical loads. In response to the EDS 250 and/or the combined electrical loads exceeding a maximum electrical generating capacity of M/G 120, the controller(s) may alternatively adjust and reduce power delivered to one or more or all the external OBLs while delivering power required by one or more of the internal vehicle electrical loads, which may include, for example, ICE 115, a cabin cooling system, vehicle lights, a hydraulic pressure pump, and any number of other essential vehicle components and systems.

As with other variations, the at least one controller is again configured to generate PDS 245 to identify the difference between power generated by the M/G and power consumed by the internal and external electrical loads, and to adjust the power generated by the M/G to minimize the power-difference signal and battery charge-discharge-cycles. The controllers are also configured to monitor the SoC of HV battery 175, and to adjust the M/G 120 to generate additional power to charge HV battery 175 response to the SoC decreasing below the charge-threshold. The OBP system 225 and coupled controllers may be also adapted to monitor the OBP system 225 to detect increases and decreases in the external OBLs. In response to an increase in OBL demand that exceeds a maximum combined-power capacity of the M/G and the battery, the controllers may also generate EDS 250 to command discontinued delivery of power to the OBP system 225 and OBLs.

For OBL demands that do not exceed the maximum capacity, the controllers may be adapted to otherwise adjust ICE 115 to respectively and correspondingly increase and decrease power generated by M/G 120. As already described, the controllers in this variation may also receive PS 255 and LBS 260, which command and/or enable further modified configurations. Each of the these and the other contemplated signals, including without limitation and for example OPS 240, PDS 245, EDS 250, and others, may be configured to generate other signals and controls, and may be generated in response to other signal and controls, including such received directly from various sensors and components of HEV 100, in addition to the already noted controllers. For further example and with continuing reference to FIGS. 1 and 2, it may be understood that various control signals (CS) 265 and other signals (OS) 270 may be received from and communicated to any of such controllers, sensors, switches, annunciators, components, systems, and subsystems. through CAN 210 and other networks and communications systems that may be incorporated with HEV 100.

Various methods of operation of HEV 100 are also taught by the disclosure, and with continued reference to FIG. 1, and now specifically also to FIG. 2, it may be understood that the methods include providing ICE 115 and M/G 120 coupled with HV battery 175 and OBP system 225, which are configured to power internal electrical loads and external OBLs. The method enables, among the many capabilities already described generating, by the one or more controllers, such as OBP system 225 and others, and in response to OPS 240, power that equals or exceeds the internal and external loads, as well as delivering power to the external OBLs, such that the SoC of HV battery 175 is sustained. Among other steps initiated at step 300 of FIG. 2, the method determines at step 305, whether HV battery is charged or below a predetermined SoC-minimum or charge-threshold, which can be a minimum voltage ("V min", FIG. 2), or another appropriate measure of SoC of HV battery 175.

If HV battery 175 has discharged below a charge-threshold of SoC-minimum, then at step 310 the controllers charge battery as described elsewhere herein, while monitoring the battery SoC at step 315 until HV battery 175 is recharged. Additionally, while SoC of HV battery 175 is monitored and recharging is accomplished if needed, the controllers also concurrently monitor HEV 100 for OPS 240 at step 320. If detected, the controllers determine at step 325 if the OBP system 225 and OBLs are demanding delivery of power and an electrical load that exceeds the capacity of M/G 120, and possibly M/G and HV battery 175 combined. If exceeded, then EDS 250 is generated at step 330, which may generate PS 255 causing one or more of the reconfigurations as already described. If capacity is not exceeded, then the method proceeds with step 335 and adjusts ICE 115 and M/G 120 to generate and deliver the demanded power to OBLs, as well as vehicle internal electrical loads, while sustaining the SoC of HV battery 175. Monitoring continues to detect at step 340 whether the OBP signal, OPS 240, persists, and if so then delivery of off-board power continues. If not, SoC of HV battery 175 is checked again at step 345.

The methods of FIG. 2 also contemplate, generating by the controllers at step 335 the PDS 245, and minimizing the signal so that the difference between power generated by M/G 120 and that consumed by the internal electrical loads and external OBLs is minimized and as close to zero as possible. This results in the controllers adjusting the generated-power to minimize the power-difference signal, which sustains the SoC of HV battery 175, preventing unnecessary battery charge-discharge-cycles. The method can be understood to thereby enable monitoring by the controller of the SoC of HV battery 175, and also adjusting M/G 120 in the various noted steps to generate additional power to charge battery 175 in response to the SoC decreasing below the charge-threshold.

The methods of operation further incorporate between steps 325, 330, 335, and 340, monitoring by the controller OBP system 225 to detect increases and decreases in the external electrical OBLs. In response to an increase in demand for OBP system 225 that exceeds the maximum combined-power capacity of the M/G and possibly also battery 175, generating EDS 250 at step 330, which may command discontinued delivery of power to OBP system 225 and OBLs, or may command any of the other noted reconfigurations. Responding to the generated EDS 250, the controllers are also modified for receiving in response PS 255 that reconfigures OBP system 225 and other components of HEV 100 and commands at least one of or one or more of: (a) supplying power from battery 175 to meet the increased electrical loads, (b) reducing power supplied to internal vehicle electrical loads to meet the increased electrical loads, and (c) limiting power delivered to the external electrical OBL to prevent battery discharge and sustain SoC.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid electric vehicle comprising:
   an engine;
   a motor; and
   a controller configured to,
      command the engine and motor to generate and deliver power to loads external to the vehicle and to sustain a state of charge of a battery, and
      responsive to the loads external to the vehicle exceeding a maximum capacity of the motor, reduce power delivered to the loads and deliver power required by loads internal to the vehicle.

2. The hybrid electric vehicle according to claim 1, further comprising:
   the controller configured to:
      generate a power-difference signal identifying a difference between power generated by the motor and consumed by the loads external to the vehicle and loads internal to the vehicle; and
      adjust generated power to minimize the power-difference signal and battery charge-discharge-cycles.

3. The hybrid electric vehicle according to claim 1, further comprising:

the controller configured to:

monitor the state of charge of the battery; and adjust the motor to generate additional power to charge the battery in response to the state of charge decreasing below a charge-threshold.

4. The hybrid electric vehicle according to claim 1, further comprising:

the controller further configured to:

responsive to the loads external to the vehicle exceeding a maximum combined-power capacity of the motor and the battery, discontinue delivery of power to the loads external to the vehicle.

5. The hybrid electric vehicle according to claim 1, further comprising:

the controller further configured to:

responsive to an increase in the loads external to the vehicle that exceeds the maximum power capacity of the motor generate an excess-demand signal; and receive in response a priority signal that commands:
 (a) supplying power from the battery to meet the increase,
 (b) reducing power supplied to the loads internal to the vehicle, or
 (c) limiting power delivered to the loads external to the vehicle to prevent battery discharge.

6. The hybrid electric vehicle according to claim 1, further comprising:

the controller further configured to:

responsive to an increase in the loads external to the vehicle that exceeds the maximum capacity of the motor, generate an excess-demand signal;

receive in response a priority signal that commands delivering power from the motor and the battery to meet the increase.

7. A hybrid electric vehicle comprising:

an engine, motor, and battery; and a controller configured to:

command the engine and motor to deliver power to the vehicle, battery charge, and external loads such that a battery charge is maintained, and responsive to an increase in the external loads, selectively supply power from the battery, reduce the power to the vehicle loads, and limit the power to the external loads according to a priority command.

8. The vehicle according to claim 7, further comprising:

the controller configured to:

generate a power-difference signal identifying a difference between power generated by the motor and power consumed by the vehicle and external loads; and adjust the power generated by the motor to minimize the power-difference signal and battery charge-discharge-cycles.

9. The vehicle according to claim 7, further comprising:

the controller configured to:

adjust the motor to generate additional power to charge the battery in response to a state of charge of the battery decreasing below a charge-threshold.

10. The vehicle according to claim 7, further comprising:

an off-board power (OBP) system coupled to the controller, motor and battery;

the controller further configured to:

monitor the OBP system to detect increases and decreases in the external loads; and responsive to an increase in demand for the OBP system that exceeds a maximum combined-power capacity of the motor and the battery, generate an excess-demand signal that commands discontinued delivery of power to the OBP system.

11. The vehicle according to claim 7, further comprising:

the controller further configured to:

monitor the OBP system to detect increases and decreases in the external loads; and adjust the engine to respectively and correspondingly increase and decrease power generated by the motor.

12. A method for a vehicle comprising:

by a controller, commanding an engine and motor to generate and deliver power to vehicle, battery charge, and external loads such that a battery charge is maintained, and responsive to an increase in the external loads, selectively supplying power from a battery, reducing the power to the vehicle loads, and limiting the power to the external loads according to a priority command.

\* \* \* \* \*